United States Patent [19]

Sato et al.

[11] Patent Number: 4,656,489
[45] Date of Patent: Apr. 7, 1987

[54] THERMAL PRINTER/PLOTTER

[75] Inventors: Tatsuo Sato; Shingo Takimoto, both of Kyoto, Japan

[73] Assignee: Shimadzu Corporation, Kyoto, Japan

[21] Appl. No.: 854,805

[22] Filed: Apr. 23, 1986

[30] Foreign Application Priority Data

Apr. 26, 1985 [JP] Japan .................................. 60-91779
May 17, 1985 [JP] Japan ................................ 60-106475

[51] Int. Cl.4 .......................... G01D 15/10; B41J 3/20
[52] U.S. Cl. ............................... 346/76 PH; 400/120
[58] Field of Search .................... 346/76 PH; 400/120

[56] References Cited

U.S. PATENT DOCUMENTS 4,262,188  4/1981  Beach ................................. 219/216
4,305,080  12/1981  Cunningham et al. ........ 346/76 PH Primary Examiner—E. A. Goldberg
Assistant Examiner—Gerald E. Preston
Attorney, Agent, or Firm—Fidelman & Wolffe & Waldron

[57] ABSTRACT

A thermal printer/plotter provided with a thermal printhead having a plurality of aligned thermal resistive elements divided into several groups for sequential driving of one group after another and simultaneous energization of the selected ones of the thermal resistive elements in each one of the groups; a DC power source having a current capacity smaller than the amount of current required for simultaneous energization of all the thermal resistive elements included in each one of the groups; a capacitor of a larger current capacity connected in parallel with the thermal resistive elements so as to discharge a sufficient amount of current to be added to the amount of current supplied by the DC power source if the latter amount is not sufficient; and control means for determining the period of time for the capacitor having been discharged to be charged again to a predetermined level in accordance with the number of the thermal resistive elements that have been energized in each one of the groups, and effecting energization of those thermal resistive elements which are to be energized in the succeeding one of the groups upon lapse of said determined period of time. Instead of the above-mentioned control means the printer/plotter may be provided with means for monitoring the charging current to the capacitor or the charged voltage thereof upon application of a drive signal to each of the groups, and effecting energization of the thermal resistive elements of the next group when the charged voltage has reached a predetermined level or there is no charging current flowing any longer.

8 Claims, 4 Drawing Figures

THERMAL PRINTER/PLOTTER

BACKGROUND OF THE INVENTION

This invention relates to a thermal printer/plotter provided with a parallel thermal printhead comprising a plurality of aligned thermal resistive elements for producing characters and/or graphs by means of dots on a sheet of heat-sensitive paper.

A typical parallel thermal printhead used in facsimile systems etc. is about 216 millimeter long and has 1000 to 4000 thermal resistive elements with a density of 6 to 16 elements per millimeter. These elements are usually divided into several groups each consisting of several hundred elements so that the elements are energized sequentially one group after another. In particular, for printing a whole line the elements of all the groups are energized group by group, and the period of time of energization is in the order of 1 ms per group. On the other hand, the amount of electric power required for energization of one resistive element is about 0.1 to 1 W, so that the total amount of power required for simultaneous energization of all the elements in one group containing several hundred elements exceeds 100 W. Usually the power required for energization of a thermal printhead is supplied by a DC source of 12 to 24 V. If a power of 120 W is to be supplied at DC 12 V, a current of 10 A is required. This means that a power source having a current capacity of more than 10 A is required.

As described above, in order to drive a thermal printhead having one to several thousand thermal resistive elements a DC power source with a current capacity of more than 10 A is required. A power source having such a high current capacity is large in size and expensive in cost.

SUMMARY OF THE INVENTION

Accordingly, the primary object of the invention is to enable driving of a thermal printhead having one to several thousand thermal resistive elements (dots) divided into several groups for sequential driving of one group after another with a DC power source of a comparatively small current capacity.

In accordance with the invention, there is provided a DC power source having a current capacity smaller than the amount of current required for simultaneous driving of all the thermal resistive elements that belong to one group, with a capacitor connected across the power source so that if an amount of current exceeding the current capacity of the power source is required for driving a certain group of thermal resistive elements, the discharge current of the capacitor charged by the source will be added to the current supplied by the source.

In one embodiment of the invention, there is provided means for determining the period of time for which the capacitor is to be charged so as to be discharged for driving the next group of thermal resistive elements in accordance with the number of the elements that have just been energized in the preceding group.

Suppose that the amount of current required for simultaneous energization of all the thermal resistive elements in one group is 10 A at DC 12 V, that the voltage drop that does not influence energization of the resistive elements is 0.4 V, and that the period of time required for energization of all the resistive elements in one group is 1 ms. If the current capacity of the power source is 3 A, the capacitor must supply a discharge current of 7 A to be added to the current from the source in order to provide a total current of 10 A. In order that the voltage drop is less than 0.4 V after a current of 7 A has been discharged for 1 ms, the capacitor must have a current capacity of more than 17500 $\mu F$. It takes about 2.3 ms to restore the capacitor voltage to the source voltage of 12 V since the charged voltage of the capacitor must be raised by 0.4 V by charging with a current of 3 A. This means that after one group of resistive elements have been energized, about 2.3 ms must elapse for charging the capacitor before the next group can be energized. As a result, the time required for energization of one group of resistive elements is 3.3 ms, and if a thermal printhead comprises eight groups of thermal resistive elements, it will take about 26 ms to energize the whole groups.

In actual printing operation, however, it rarely happens that all the thermal resistive elements included in one group are energized at the same time. Usually, the ratio of the thermal resistive elements that are energized in one group to those which are not is comparatively small. Therefore, a power source with a current capacity of 3 A suffices in most cases and it would be a waste of time to provide a waiting time of more than 2 ms after each group of thermal resistive elements have been energized and before the next group is energized.

In the arrangement of the invention, when each of the groups of thermal resistive elements have been energized, the waiting time for charging the capacitor for energization of the next group is determined in accordance with the number of the elements that have just been energized in the preceeding group. Without any unnecessary fixed waiting time for charging the capacitor, the apparatus of the invention is capable of effecting energization of the required thermal resistive elements in all the groups in the thermal printhead at substantially the same speed as if a power source with as large a current capacity as would actually be required for simultaneous energization of all the resistive elements included in one group were used.

In the above embodiment of the invention, the period of time for which the capacitor is charged so as to provide a discharge current to be added to the current supplied by the power source for energizing each group of thermal resistive elements is determined in accordance with the number of the resistive elements that have actually been energized in the immediately preceeding group.

In another embodiment of the invention, there is provided means for monitoring the charged voltage of the capacitor or current charging the capacitor to effect energization of the thermal resistive elements of the next group when a predetermined level has been recovered by the charged voltage of the capacitor, or there is no current charging the capacitor any longer.

The invention will be described in detail with reference to the accompanying drawing.

DESCRIPTION OF THE PREFERRED EMBODIMENTS

Figure 1:
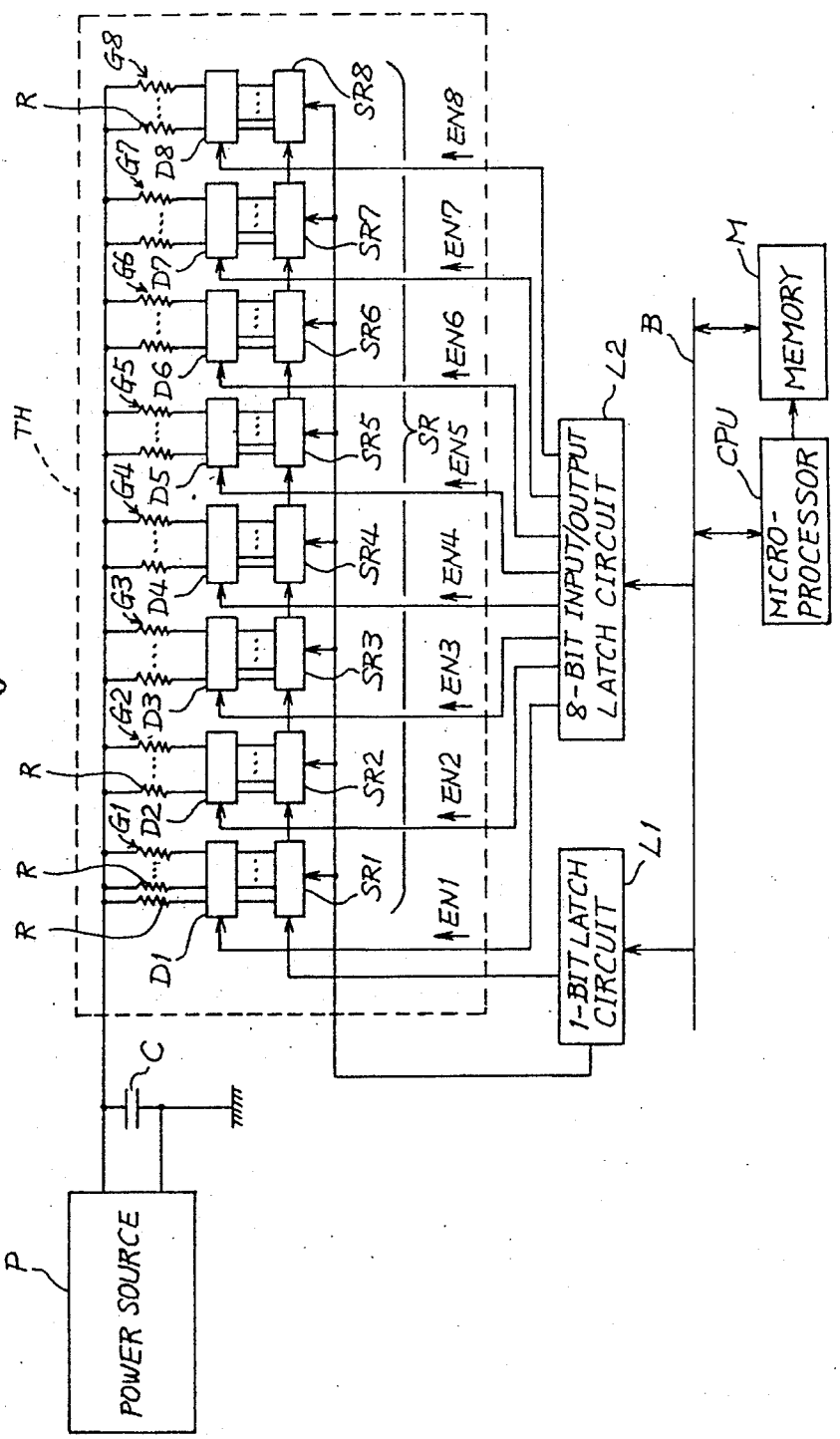
FIG. 1 shows a block diagram of one embodiment of the invention.

Referring to FIG. 1, there is schematically shown as a block a parallel thermal printhead TH which comprises a plurality, say, 1728 thermal resistive elements (dots) R aligned along a length of 216 mm, with a density of 8 element (dot)/mm. The elements are divided into eight serially arranged groups G1 through G8 each containing 216 elements. The eight groups are individually driven by eight corresponding drivers D1 through D8. Eight serial-in/parallel-out shift registers SR1 to SR8 corresponding to the drivers D1 to D8, respectively, are serially connected to form a 1728-bit register SR.

A memory M stores a program for controlling energization of the thermal printhead TH and the data to be printed out. The data is supplied from, say, an instrument (not shown) through a bus line B. A microprocessor or the like CPU reads out the data to be printed out one line at a time from the memory M through the bus B, and transmits the data one bit at a time to the shift registers SR1–SR8 through the bus B and a 1-bit latch circuit L1. When the transmission of the data for one line has been completed, the microprocessor CPU causes an 8-bit input/output latch circuit L2 to successively produce drive signals EN1 through EN8 for 1 ms to be applied to the drivers D1 through D8, respectively. When the drivers receive a drive signal, they control energization of the resistive elements R in accordance with the high or low level of the output of each of the eight bits of the corresponding shift registers SR1 to SR8. When the driver D8 has completed its operation in response to the drive siganl EN8, the operation of printing the one line has been finished.

A power source P has a current capacity of, say, 3 A at DC 12 V and supplies a current to the thermal printhead TH. The source P can be a stabilized power source which functions as a constant voltage source which produces an output voltage of 12 V until the output current becomes 3 A and as a constant current source which maintains the output current at 3 A by reducing the output voltage when the output current is about to exceed 3 A. An electrolytic capacitor C having a capacitance of about 20,000 μF is connected to the power source P in parallel with the thermal resistive elements R.

Figure 2:
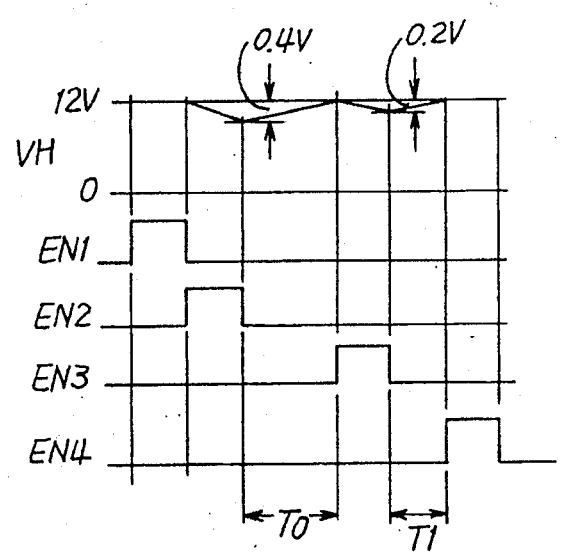
FIG. 2 shows a time chart for explaining the operation of the arrangement of FIG. 1.

In the above arrangement the operation of the microprocessor CPU will now be explained with reference to the time chart shown in FIG. 2. The previously mentioned drive signals EN1 to EN8, only four of which are shown by way of example at EN1 to EN4, consist of a pulse signal having a pulse width of 1 ms. Suppose that the number of the thermal resistive elements that are to be energized in the first group is so small that the current required for energization of the elements is below 3 A. The voltage of the thermal printhead TH shown at VH in FIG. 2 is equal to the voltage across the capacitor C. Despite the energization of the first group the voltage VH is kept unchanged at 12 V. The microprocessor CPU calculates the number of the resistive elements that have been energized in the first group. When the energization of the required elements in the first group has been completed, the microprocessor judges by the number of the energized resistive elements that there has been no drop in the voltage VH at the thermal printhead caused by the energization and gives instructions to the latch circuit L2 to produce a signal EN2 upon termination of the preceding signal EN1.

Suppose again that all the resistive elements of the second group are to be energized. The amount of current required for energization of the second group is about 10 A exceeding the current capacity of the power source P, so that the voltage VH of the thermal printhead TH has dropped by about 0.4 V at the end of the signal EN2 as shown in FIG. 2. The time required for charging the capacitor C for recovery from the voltage drop is about 2.3 ms. The microprocessor CPU knows that all the elements of the second group have been energized, and waits for 2.3 ms shown at To in FIG. 2 for the capacitor C to be fully charged, and then gives instructions to the latch circuit L2 to produce a third drive signal EN3.

Suppose once again that 140 thermal resistive elements among the 216 elements of the third group are to be energized. The amount of current required for energization of the 140 elements is about 6.5 A, and the drop of the voltage VH at the end of the signal EN3 is about 0.2 V. In accordance with a predetermined program the microprocessor CPU calculates the waiting time for the capacitor C to be fully charged to obtain 1.5 ms, and waits for 1.5 ms shown at T1 in FIG. 2, and then gives instructions to the latch circuit L2 to produce a fourth drive signal EN4 to be applied to the drive D4.

In a similar manner the microprocessor CPU continues to control energization of the succeeding groups of thermal resistive elements until the eighth group is energized.

As previously mentioned, the amount of current required for energization of all the 216 resistive elements in one group is 10 A. For energization of less than 64 resistive elements the amount of current required is smaller than 3 A, so that no waiting time for charging the capacitor C need be provided. As the number of the resistive elements that must be energized increases from 65 to 216, the waiting time increases linearly from 0 to 2.3 ms. The waiting time may be calculated by the microprocessor CPU according to the above-mentioned linear function.

Alternatively and in a simpler manner, the numbers from 65 to 216 of thermal resistive elements may be divided into several groups, for each of which a waiting time for charging the capacitor is determined, so that the waiting time changes stepwise as the number of the thermal resistive elements to be energized changes.

Figure 3:
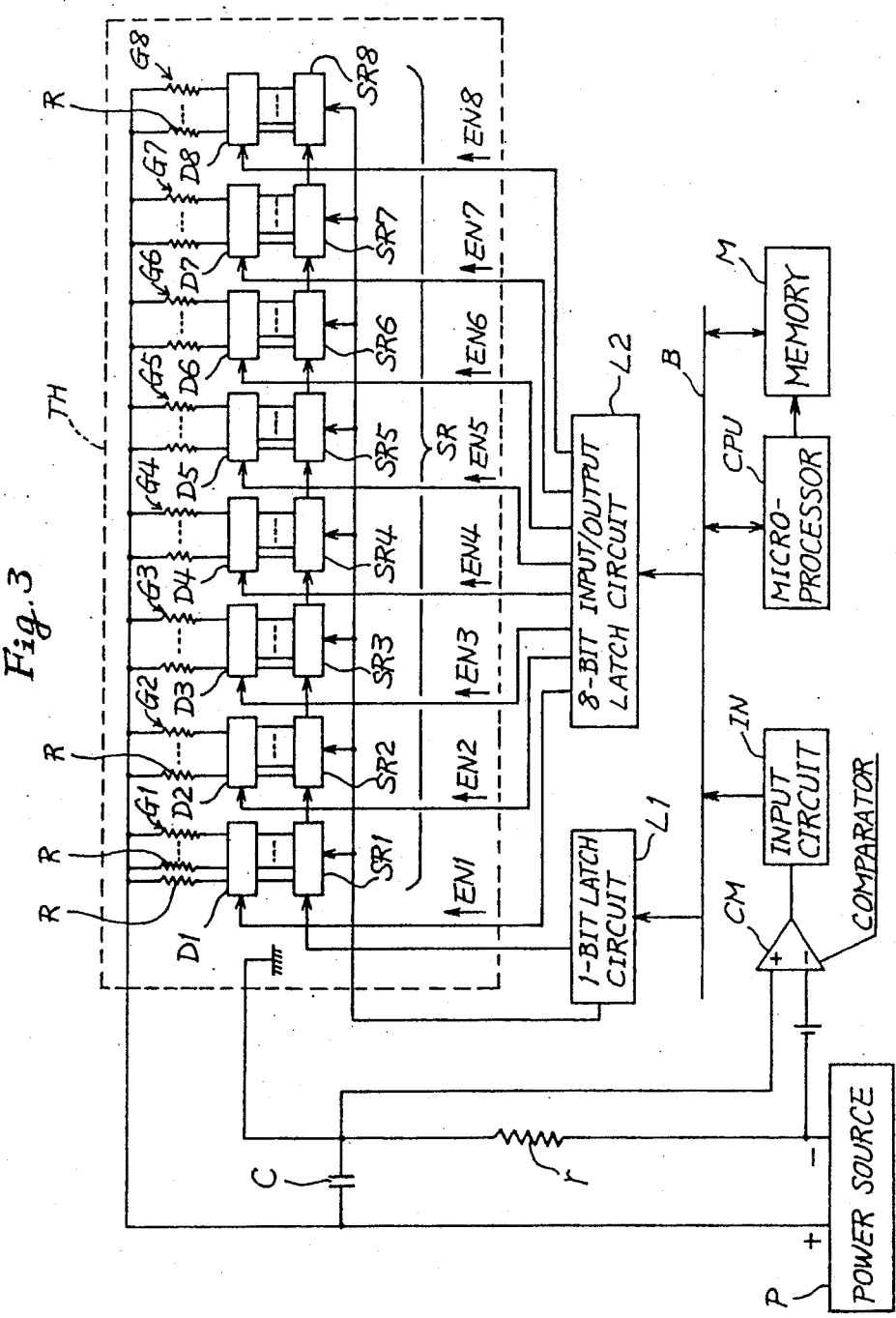
FIG. 3 shows a block diagram of another embodiment of the invention.

Another embodiment of the invention is shown in FIG. 3, wherein the same reference symbols as in FIG. 1 designate the corresponding component parts so that no explanation will be given to them except when necessary.

A comparator CM detects the voltage drop across a resisitor r caused by the current charging the capacitor C. While a current charging the capacitor C is flowing through the resistor r, the output of the comparator CM remains at a low level and becomes of a high level when the current stops flowing. The microprocessor CPU monitors the output of the comparator CM through an input circuit IN thereby to control application of the drive signals EN1 to EN8 to the drivers D1 to D8.

Figure 4:
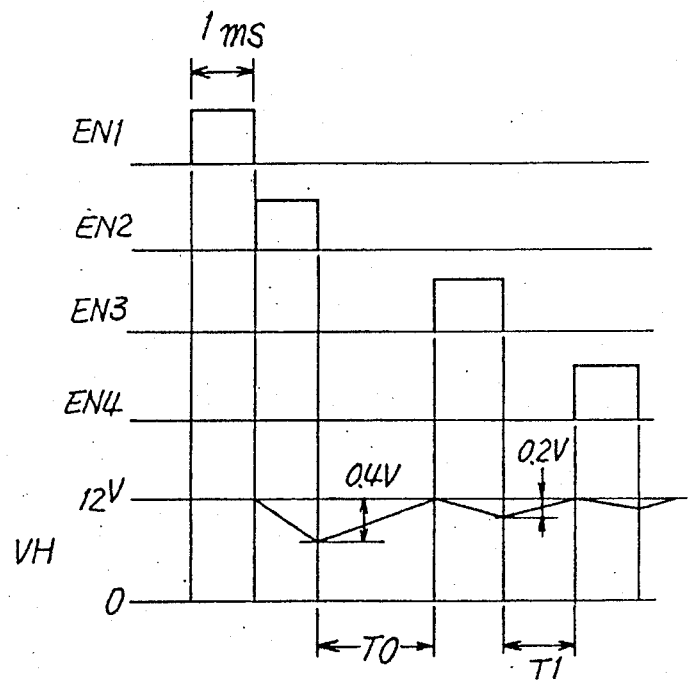
FIG. 4 shows a time chart for explaining the operation of the arrangement of FIG. 3.

Referring to FIG. 4, the operation of the embodiment of FIG. 3 will now be explained. Four drive signals EN1 to EN4 in the form of a pulse signal having a width of 1 ms are shown by way of example.

Suppose that the number of the thermal resistive elements that have been energized in the first group is so small that the current consumed for energization of the elements is below 3 A. The voltage VH of the thermal printhead TH is equal to the voltage across the capacitor C. Despite the energization of the first group the voltage VH is kept unchanged at 12 V. Now there is no current charging the capacitor C and the output of comparator CM remains at a high level. The microprocessor CPU monitoring the output of the comparator CM through the input circuit IN judges that there has been no drop in the voltage VH at the thermal printhead caused by the energization of the thermal resistive elements of the first group and gives instructions to the latch circuit L2 to produce a signal EN2 upon termination of the preceding drive signal EN1.

Suppose again that all the resistive elements of the second group are to be energized. The amount of current required for energization of the second group is about 10 A which exceeds the current capacity of the power source P, so that the voltage VH of the thermal printhead TH drops by about 0.4 V at the end of the signal EN2. In this case a current of about 3 A flows to charge the capacitor C thereby to change the output of the comparator CM to a low level, so that the microprocessor CPU will not produce the next drive signal EN3 at the end of the preceding signal EN2. After a period of time To (which is about 2.3 ms) the capacitor C becomes fully charged so that no charging current flows. This renders the output of the comparator CM of a high level, whereupon the microprocessor CPU gives instructions to the latch circuit L2 to produce a third drive signal EN3.

Suppose once again that 140 thermal resistive elements among the 216 elements of the third group are to be energized. The amount of current required for energization of the 140 elements is about 6.5 A, and the drop of the voltage VH at the end of the signal EN3 is about 0.2 V. The required amount of current exceeds the amount available from the power source, and the shortage is covered by the capacitor C. Then a charging current flows to change the output of the comparator CM to a low level, so that the microprocessor CPU will not produce the next drive signal EN4 until after a period of time T1 (about 1.5 ms) the capacitor is fully charged, whereupon a fourth drive signal EN4 is produced.

In a similar manner the microprocessor CPU continues to control energization of the succeeding groups of thermal resistive elements until the eigth group is energized.

In the above embodiment, the charging current to the capacitor C is monitored and when it has become zero, the next drive signal is produced. Alternatively, it is possible to monitor the charged voltage of the capacitor and produce the next drive signal when the voltage has reached a predetermined level.

Generally, when a character, a graph, a figure or a diagram is printed, the number of those of the thermal resistive elements which are used or energized in a thermal printhead is far smaller than the number of those which are not. Therefore, a power source capable of providing a sufficient amount of current for energization of all the thermal resistive elements in one group is rarely operated at full power.

In accordance with the invention, a power source having a smaller current capacity can be used, so that the size and cost of the power source is reduced and its utility is increased. With a power source with a relatively small current capacity it is possible to perform printing operation at substantially the same speed as with a power source having a sufficiently large current capacity.

What we claim is:

1. A thermal printer/plotter comprising:
    (a) a parallel thermal printhead including a plurality of thermal resistive elements divided into a plurality of groups and so arranged in a row as to produce a line of dots on a sheet of heat-sensitive paper when said thermal resistive elements are energized;
    (b) means for selecting those of said thermal resistive elements which are to be energized in each one of said groups;
    (c) means for producing a drive signal to be sequentially applied to one of said groups after another for simultaneous energization of said selected thermal resistive elements of each one of said groups;
    (d) a DC power source having a current capacity smaller than the capacity that can provide the amount of current required for simultaneous energization of all the thermal resistive elements in each one of said groups;
    (e) a capacitor connected to said power source in parallel with each of said thermal resistive elements, so that said capacitor provides a sufficient amount of discharge current to be added to the amount of current supplied by said power source when said latter amount is short of the amount required for simultaneous energization of said selected thermal resistive elements of each one of said groups; and
    (f) control means for determining the period of time for said capacitor to be charged to a predetermined level after the termination of said drive signal applied to each one of said groups in accordance with the number of said selected thermal resistive elements which have been energized in each one of said groups, and causing said drive signal producing means to produce a drive signal to be applied to the succeeding one of said groups upon lapse of said determined period of time.

2. The apparatus of claim 1, wherein said selecting means comprises a plurality of serially connected serial-in/parallel-out shift regisers each connected to one of said groups of thermal resistive elements, and said drive signal producing means comprises an input/output latch circuit.

3. The apparatus of claim 2, wherein said control means comprises a microprocessor which
    selects those of said thermal resistive elements which are to be energized in each one of said groups in accordance with data to be printed,
    causes the data concerning said selected thermal resistive elements to be set in each of said shift registers,
    determines the period of time for said capacitor to be charged to a predetermined level after the termination of said drive signal applied to each one of said groups in accordance with the number of said selected thermal resistive elements which have been energized in each one of said groups, and
    causes said input/output latch circuit to produce a drive signal to be applied to the succeeding one of said groups upon lapse of said determined period of time.

4. The apparatus of claim 3, further including a memory for storing said data to be printed.

5. A thermal printer/plotter comprising:
(a) a parallel thermal printhead including a plurality of thermal resistive elements divided into a plurality of groups and so arranged in a row as to enable production of a line of dots on a sheet of heat-sensitive paper when said thermal resistive elements are energized;
(b) means for selecting those of said thermal resistive elements which are to be energized in each one of said groups;
(c) means for producing a drive signal to be sequentially applied to one of said groups after another for simultaneous energization of said selected thermal resistive elements in each one of said groups;
(d) a DC power source having a current capacity smaller than the capacity that can provide the amount of current required for simultaneous energization of all the thermal resistive elements in each one of said groups;
(e) a capacitor connected to said power source in parallel with each of said thermal resistive elements, so that said capacitor provides a sufficient amount of discharge current to be added to the amount of current supplied by said power source when said latter amount is short of the amount required for simultaneous energization of said selected thermal resistive elements of each one of said groups; and
(f) control means for monitoring the charging current to said capacitor or the charged voltage thereof upon production of said drive signal to effect energization of said selected thermal resistive elements of each one of said groups, and causing said drive signal producing means to produce a drive signal to effect simultaneous energizatin of said selected thermal resistive elements in the succeeding one of said groups when said charging current has stopped flowing or said charged voltage has reached a predetermined level.

6. The apparatus of claim 5, wherein said selecting means comprises a plurality of serially connected serial-in/parallel-out shift registers each connected to one of said groups of thermal resistive elements, and said drive signal producing means comprises an input/output latch circuit.

7. The apparatus of claim 5, wherein said control means comprises:
a comparator for comparing said charging current or charged voltage with a reference level to produce a corresponding output signal when said current or voltage has reached said reference level; and
a microprocessor which selects those of said thermal resistivie elements which are to be energized in each of said groups in accordance with data to be printed, causes the data concerning said selected thermal resistive elements to be set in each of said shift registers, and operates in response to the output of said comparator to cause said input/output latch circuit to produce a drive signal to be applied to the succeeding one of said groups.

8. The appratus of claim 7, further including a memory for storing said data to be printed.

* * * * *